United States Patent
Martsinovsky et al.

(10) Patent No.: US 7,987,388 B2
(45) Date of Patent: Jul. 26, 2011

(54) BACKPLANE

(75) Inventors: Georgy Martsinovsky, St. Petersburg (RU); Igor Misyuchenko, St. Petersburg (RU)

(73) Assignee: Siemens Aktiengesellschaft, Munich (DE)

( * ) Notice: Subject to any disclaimer, the term of this patent is extended or adjusted under 35 U.S.C. 154(b) by 291 days.

(21) Appl. No.: 12/086,799

(22) PCT Filed: Dec. 20, 2005

(86) PCT No.: PCT/RU2005/000653
§ 371 (c)(1),
(2), (4) Date: Jun. 19, 2008

(87) PCT Pub. No.: WO2007/073229
PCT Pub. Date: Jun. 28, 2007

(65) Prior Publication Data
US 2009/0006684 A1 Jan. 1, 2009

(51) Int. Cl.
*G06F 11/00* (2006.01)
(52) U.S. Cl. .......................................................... 714/26
(58) Field of Classification Search .................... 714/26
See application file for complete search history.

(56) References Cited

U.S. PATENT DOCUMENTS

| | | | |
|---|---|---|---|
| 6,496,376 B1 | 12/2002 | Plunkett et al. | |
| 7,158,781 B2 * | 1/2007 | Garnett et al. | 455/418 |
| 7,434,102 B2 * | 10/2008 | Rothman et al. | 714/36 |
| 7,519,749 B1 * | 4/2009 | Sivertsen | 710/73 |
| 7,590,727 B1 * | 9/2009 | Barnes | 709/224 |
| 7,725,767 B2 * | 5/2010 | Sasaki | 714/13 |
| 2003/0014587 A1 | 1/2003 | Bouvier et al. | |
| 2003/0101304 A1 * | 5/2003 | King et al. | 710/301 |
| 2003/0177425 A1 | 9/2003 | Okin | |
| 2004/0153749 A1 * | 8/2004 | Schwarm et al. | 714/11 |
| 2004/0255189 A1 * | 12/2004 | Chu et al. | 714/13 |
| 2006/0161972 A1 * | 7/2006 | Cromer et al. | 726/5 |
| 2006/0203460 A1 * | 9/2006 | Aviv | 361/788 |

FOREIGN PATENT DOCUMENTS

WO WO 01/93650 A1 12/2001

OTHER PUBLICATIONS

Windeck Christof, "Zwillings-Rennen, Elf Dual-Mainboards für AMD Athlon MP und Intel Xeon", CT Magazine for Computer Technic, Jun. 3, 2002, pp. 1-13, vol. 12, XP001112437, Heise Magazine Publishing Company, Hannover, DE.
Siemens AG—Catalog, "Produkte fü Automation und Micro Automation", ST 70, 2005, pp. 5/93-5/96.
Beckhoff, "PC—Die Maschinensteuerung der nächsten Generation.\Der Konkurrenzkampf beginnt: Was der PC gegenüber den altbewährten SPS- and NC-Systemen besser kann", Elektronik, Weka Fachzeitschriftenverlag, Poing, DE, Aug. 20, 1991, pp. 106-114, 116, vol. 40, No. 17, 20, XP000260943ISSN: 0013-5658.

* cited by examiner

*Primary Examiner* — Bryce P Bonzo

(57) ABSTRACT

There is described a backplane with connections for connecting functional units. The backplane has hardware resources to handle software tasks, wherein the hardware resources are redundantly implemented or comprise essentially identical hardware modules, and wherein the hardware resources are organized in such that the software tasks are dynamically assigned to the hardware resources.

14 Claims, 2 Drawing Sheets

BACKPLANE

CROSS REFERENCE TO RELATED APPLICATIONS

This application is the US National Stage of International Application No. PCT/RU2005/000653, filed Dec. 20, 2005 and claims the benefit thereof. The International Application is incorporated by reference herein in its entirety.

FIELD OF INVENTION

The invention relates to a backplane with connections for connecting functional units.

BACKGROUND OF INVENTION

A backplane of this kind is known from Siemens Catalog ST 70, pages 5/93 to 5/96, 2005 edition. The backplane is intended for a programmable controller and has slots into which functional units, e.g. functional units in the form of a CPU board, communication board, input/output board or other board or module suitable for the programmable controller, can be inserted. The programmable controller is designed for controlling a technical process and for solving control and automation tasks in the lower, medium and upper performance class. Which functional units and how many of these functional units are to be used is dependent on the automation task to be solved, functional units being used on a redundant basis as required. Should the programmable controller have to be extended in order e.g. to solve a more complex automation task, it is generally necessary to equip the programmable controller with new CPU and/or other intelligent functional module, to replace already inserted modules by more powerful ones and/or to provide the programmable controller with additional software functional modules. This procedure is expensive and prone to error. In addition, it is necessary for a large number of functional units to be held in store.

SUMMARY OF INVENTION

An object of the present invention is to specify a backplane of the abovementioned type which allows adaptation to an automation task to be solved.

This object is achieved by the measures set forth in an independent claim.

By means of the invention, adaptation to an automation task to be solved is essentially effected by the backplane provided with the hardware resources and by the software tasks fed to the backplane.

By means of essentially identical hardware components, the possibility of distributing the software task to them is created. The invention is based on the idea of implementing present-day functional modules, e.g. functional modules in the form of CPU boards, in future in software and expanding the present-day backplane with appropriate hardware (essentially identical hardware components).

The advantage of this is that it obviates the need to use CPU or other intelligent functional boards to solve an automation task. The functionality and action of these modules is essentially realized by uniform hardware resources of the backplane and by at least one software task which a remote location communicates to the backplane. The hardware resources are organized in such a way that the software task can be dynamically assigned to them, the hardware resources themselves or a configuration controller effecting the assignment and the hardware resources handling the software task. By means of the essentially uniform hardware resources and the possibility of remote configuring via the remote location, dynamic adaptation of the backplane's resources e.g. to a more complex system to be controlled is facilitated.

At runtime of a software task or of a plurality of software tasks, additional software tasks can be fed to the backplane which are assigned to the hardware resources together with the already fed software tasks, load sharing of the hardware resources being possible at runtime of the software tasks. This on the one hand further improves the flexible matching of software tasks to the backplane's resources and, on the other, achieves essentially homogeneous load distribution.

The hardware resources exchange information via a high-speed bus, each hardware resource essentially having a microprocessor, a memory and an input/output processor. The component parts of each hardware resource are preferably realized in the form of a "system-on-programmable-chip" which itself dynamically varies or adapts the structure of its components as a function of the division or breakdown of a control task.

In one embodiment of the invention it is provided that a "hot stand-by resource" can be assigned to at least one of the hardware resources, thereby enabling a redundant operating mode of hardware resources for solving automation tasks with exacting requirements in terms of failure safety to be realized.

In another embodiment of the invention the backplane is provided with an evaluating processor unit for monitoring the hardware resources. In the event of a hardware resource fault, the evaluating processor unit switches this hardware resource to passive mode. In this case the software tasks are assigned to the remaining fault-free hardware resources, thereby maintaining automation operation.

Advantageously the hardware resources are implemented in the form of "flat electronic panels" which are connected to the backplane using "flat cut-off connectors", thereby enabling a faulty hardware resource to be easily removed from the backplane and replaced by a new hardware resource.

The backplane can be provided with a communication controller for communicating with the remote location and with a configuration controller in which the configuration of the hardware resources activated and/or to be activated is stored. The configuration controller enables hardware resources to be activated, deactivated, reassigned and/or tested.

Further advantageous embodiments of the invention will emerge from the other sub-claims.

BRIEF DESCRIPTION OF THE DRAWINGS

The invention, its embodiments and advantages will now be explained in greater detail with reference to the accompanying drawings which illustrate an exemplary embodiment and in which.

The same reference characters are used to denote the same parts illustrated in FIGS. 1 and 2.

DETAILED DESCRIPTION OF INVENTION

Figure 1:
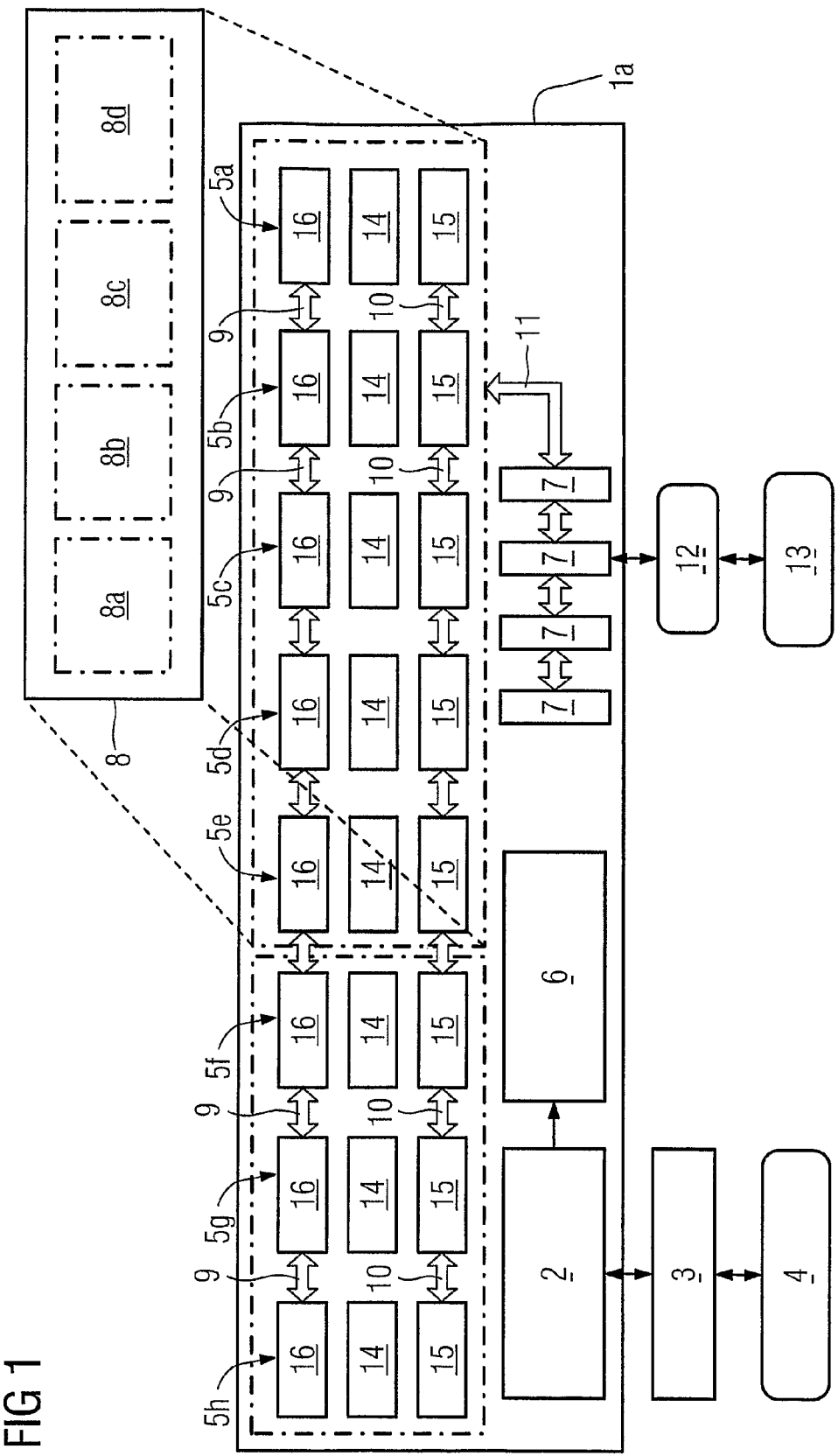
FIGS. 1 and 2 show simplified diagrams of an arrangement using a reconfigurable backplane.

In FIG. 1, 1a denotes a reconfigurable backplane 1a which is provided with a communication controller 2. Via this communication controller 2 and a communication network 3, the backplane 1a is connected to a remote location 4 by which software tasks can be fed to the backplane 1a. The remote location 4 can be implemented e.g. in the form of a personal computer, known per se, which is provided with a suitable Internet browser. In this case communication between the remote location 4 and the backplane 1a can take place via the Internet or World Wide Web. Other essential component parts of the backplane 1a are redundantly implemented hardware resources 5a, 5b, 5c, 5d, 5e, a configuration controller 6 and slots 7. In the example shown the hardware resources 5a, 5b, 5c, 5d, 5e are activated and provided for handling software tasks 8. On the other hand the hardware resources 5f, 5g and 5h are deactivated and serve as spare hardware resources in order e.g. to facilitate dynamic adaptation of the resources to a more complex automation task to be solved.

Via a high-speed bus 9, 10, the hardware resources 5a, . . . 5h exchange information bits which can access the slots 7 in read and/or write mode via another bus 11. Insertable in these slots 7 are e.g. input/output devices 12 to which sensors and/or actuators 13 are connected which are provided for detecting process input signals of a system to be controlled or for outputting process output signals. Each hardware resource 5a, . . . 5h is provided with a microprocessor 14, an input/output processor 15 and a memory 16, each hardware resource 5a, . . . 5h being able to access both its own memory 16 and the memory 16 of the other hardware resources 5a, . . . 5h in read and/or write mode.

It will now be assumed that the software tasks 8 include a first and a second PLC (programmable logic controller) task 8a, 8b, a web server task 8c and a manager task 8d. The first and second PLC tasks 8a, 8b are provided to implement a programmable control in each case which simulates the functionality of a CPU module processing a control program. The web server task 8c is used e.g. for providing information according to the so-called HTTP protocol and the manager task 8d administers, for example, the deactivated spare hardware resources 5f, 5g, 5h. The hardware resources 5a, 5b, . . . 5e are organized in such a way that the PLC tasks 8a, 8b, web server task 8c and manager task 8d fed to the backplane 1a by the remote location 4 can be dynamically assigned to these hardware resources 5a, 5b, . . . 5e. In this example the configuration controller 6 assigns these tasks 8a, . . . 8d to the hardware resources 5a, 5b, . . . 5e for handling the tasks 8a, . . . 8d, preferably in such a way that an essentially homogeneous load sharing of hardware resources 5a, 5b, . . . 5e is effected.

Figure 2:
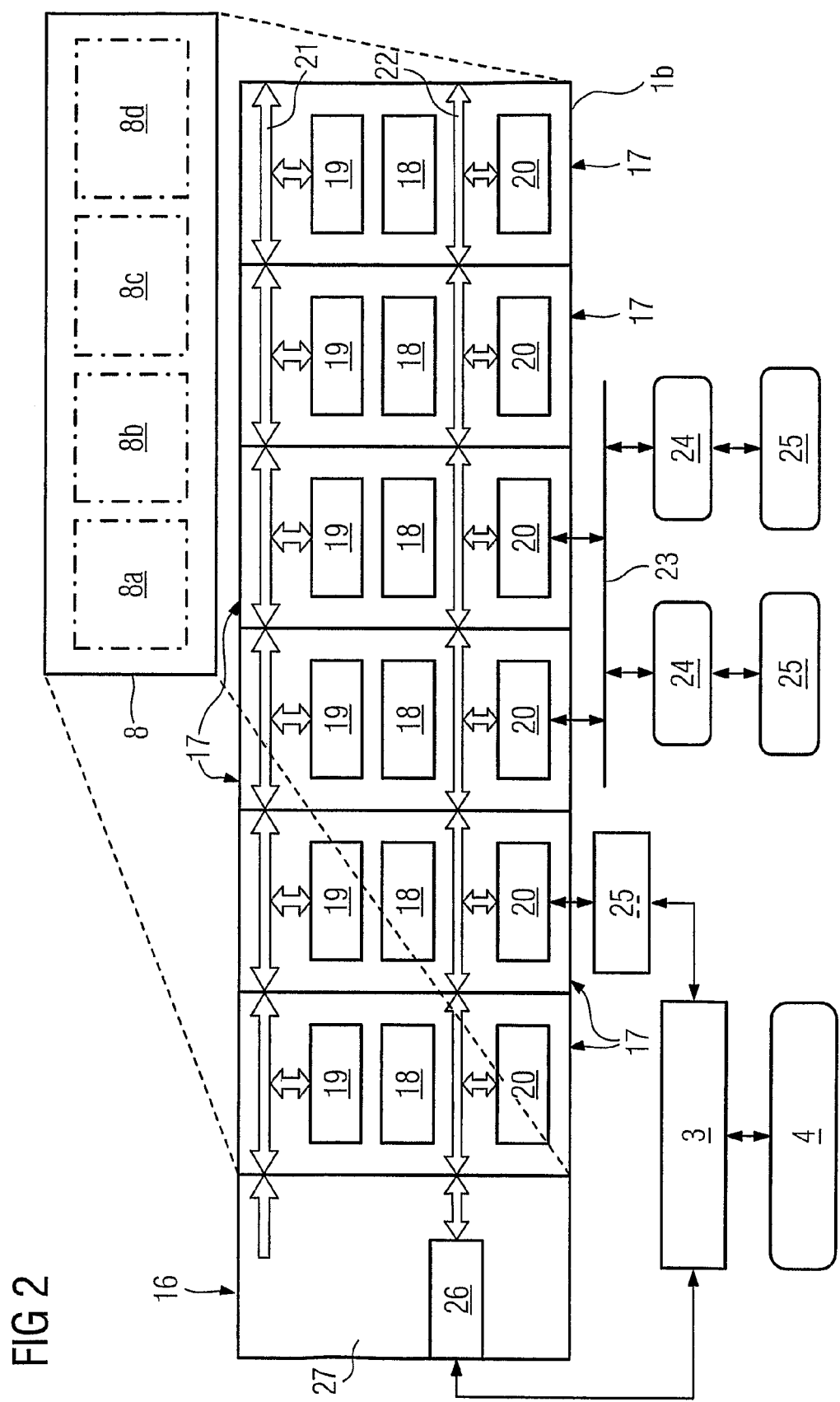

The configuration controller 6 can be dispensed with if the hardware resources assign the software tasks 8 to themselves. For further explanation, reference will now be made to FIG. 2.

In contrast to the backplane 1a, a backplane 1b has a plurality of hardware resources, each of which is implemented in the form of a hardware module 17. These have connecting means (not shown here) via which the hardware modules 17 can be mechanically and electrically combined. Essential component parts of the hardware resources of each module 17 are a microprocessor 18, a memory 19 and an input/output socket 20, assembled hardware modules 17 being interconnected via a bus 21, 22. A backplane 1b of this kind can be easily expanded with other hardware modules 17, whereby in the case of expansion with other hardware modules 17 the hardware resources themselves re-assign and handle the software tasks 8. To the input/output sockets 20 there can be connected, e.g. via a suitable communications link 23, input/output devices 24, e.g. in the form of intelligent field devices, which are connected to other automation components 24. The software tasks 8 are transmitted by the remote location 4 to the backplane 1b via the communication network 3, information being exchangeable between the backplane 1b and the remote location 4 either via one of the input/output sockets 20 and an Ethernet adapter 25 or via an Ethernet socket 26 of a terminating module 27 of the backplane 1b.

The invention claimed is:

1. A backplane, comprising:
   connections to connect functional units; and
   hardware resources to handle software tasks,
   wherein the hardware resources are redundantly implemented or comprise essentially identical hardware modules,
   wherein the hardware resources themselves or a configuration controller dynamically assign the software tasks to the hardware resources,
   wherein the software tasks include a programmable logic controller task, the programmable logic controller task implementing a programmable control which simulates a functionality of a CPU module processing a control program,
   wherein the software tasks are transmitted by a remote location to the backplane via a communication network, and
   wherein information is exchanged between the backplane and the remote location either via in input/output socket and an Ethernet adapter or via an Ethernet socket of a terminating module of the backplane.

2. The backplane as claimed in claim 1, wherein the hardware resources are interconnected via a high-speed bus.

3. The backplane as claimed in claim 1, wherein each hardware resource has a microprocessor, a memory, an input and an output.

4. The backplane as claimed in claim 3, wherein the component parts of the hardware resources are realized by way of a system-on-programmable-chip.

5. The backplane as claimed in claim 1, wherein further software tasks are fed to the backplane at a runtime of the software tasks.

6. The backplane as claimed in claim 1, wherein the hardware resources are organized such that load sharing of the hardware resources occurs at runtime of the software tasks.

7. The backplane as claimed in claim 1, wherein at least one of the hardware resources is assigned a hot stand-by resource.

8. The backplane as claimed in claim 1, wherein the backplane has an evaluating processor unit for monitoring the hardware resources, wherein in the event of a fault of a hardware resource the evaluating processor unit switches faulty hardware resource to passive mode.

9. The backplane as claimed in claim 8, wherein the hardware resources are fixed-mounted.

10. The backplane as claimed in claim 8, wherein the hardware resources are flat electronic panels connected to the backplane using flat cut-off connectors.

11. The backplane as claimed in claim 1, wherein the connections are slots or input/output sockets.

12. The backplane as claimed in claim 11, wherein the hardware resources have read and/or write access to the connections.

13. The backplane as claimed in claim 12, wherein each hardware resource has read and/or write access to memories of an other hardware resource.

14. The backplane as claimed in claim 13, wherein the backplane has a first communication controller to communicate with the remote location and a second configuration controller in which is stored configuration of the hardware resources activated and/or to be activated.

* * * * *